(12) United States Patent
Baettig et al.

(10) Patent No.: US 6,320,031 B1
(45) Date of Patent: Nov. 20, 2001

(54) MONOAZO DYES AND THEIR PREPARATION AND USE

(75) Inventors: Kurt Baettig, Praroman; Gérald Jan, Villars-sur-Glâne, both of (CH)

(73) Assignee: Ilford Imaging Switzerland GmbH (CH)

( * ) Notice: Subject to any disclaimer, the term of this patent is extended or adjusted under 35 U.S.C. 154(b) by 0 days.

(21) Appl. No.: 09/510,647

(22) Filed: Feb. 23, 2000

(30) Foreign Application Priority Data

Feb. 23, 1999 (EP) .................................................. 99810158

(51) Int. Cl.$^7$ ........................ C09B 29/085; C09B 43/16; C09D 11/02
(52) U.S. Cl. .............................. 534/803; 534/728; 8/437; 8/527; 8/536; 8/917; 8/918; 8/919; 8/106; 8/31.48
(58) Field of Search ...................... 534/803, 728; 106/31.48; 8/437, 527, 586, 682, 917, 918, 919

(56) References Cited

U.S. PATENT DOCUMENTS

| 4,626,284 | 12/1986 | Ohta et al. . |
| 4,703,113 | 10/1987 | Baxter et al. . |
| 4,963,189 | 10/1990 | Hindagolla . |
| 5,684,140 | 11/1997 | Baettig et al. . |

FOREIGN PATENT DOCUMENTS

| 0425150A2 | 5/1991 | (EP) . |
| 0567036A1 | 10/1993 | (EP) . |
| 0597672A2 | 5/1994 | (EP) . |
| 0755984A1 | 1/1997 | (EP) . |
| 0859033A1 | 8/1998 | (EP) . |
| 0918074A1 | 5/1999 | (EP) . |
| 0924263A1 | 6/1999 | (EP) . |
| 2289473A | 11/1995 | (GB) . |
| WO 96/24635 | 8/1996 | (WO) . |
| WO 96/24636 | 8/1996 | (WO) . |
| WO 98/12263 | 3/1998 | (WO) . |

*Primary Examiner*—Fiona T. Powers
(74) *Attorney, Agent, or Firm*—Onofrio Law

(57) ABSTRACT

Monoazo dyes of formula (3)

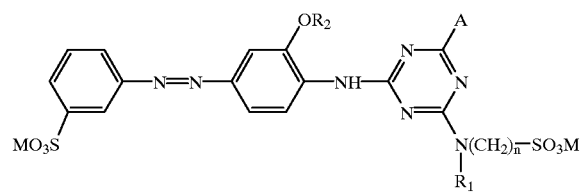

(3)

wherein A, $R_1$, $R_2$, M and n are as defined in the specification, are excellent dyes for dyeing and printing of cellulose containing materials and especially for the preparation of inks for ink jet printing.

10 Claims, No Drawings

MONOAZO DYES AND THEIR PREPARATION AND USE

FIELD OF THE INVENTION

This invention relates to novel monoazo dyes and their salts, a method of their preparation and their use in dying and printing operations. It relates also to liquid dye preparations containing these dyes, particularly to aqueous inks for ink jet printing.

BACKGROUND OF THE INVENTION

Ink jet printing processes are essentially of two types, continuous stream and drop-on-demand.

In continuous stream ink jet printing systems, ink is emitted in a continuous stream under pressure through a nozzle. The stream breaks up into droplets at a fixed distance from the nozzle. If a specific location on the recording sheet has to be printed the individual droplets are directed to this specific location, otherwise they are directed to a gutter. This is done for example by charging unnecessary droplets in accordance with digital data signals and passing them through an electric static field which adjusts the trajectory of these droplets in order to direct them to the gutter. The inverse procedure may also be used wherein uncharged droplets are directed to the gutter.

In the non-continuous process, or the so called "drop-on-demand" systems, a droplet is generated only in accordance with digital data signals if it is to be placed onto the recording sheet.

The most important part of an ink for ink jet printing are the dyes. Although a number of dyes have been proposed none meets all the necessary requirements.

Yellow monoazo dyes or mixtures of such dyes and their use in inks for ink jet printing are described for example in U.S. Pat. No. 5,684,140 or in patent applications WO 98-12263, EP 0,567,036 and EP 0,755,984.

The monoazo dye of formula (1)

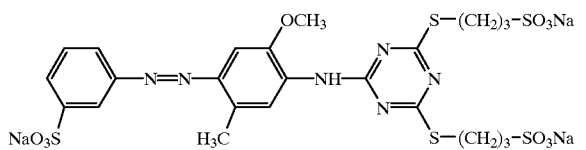

(1)

is described in patent application EP 0,755,984 (example 104).

The monoazo dye of formula (2)

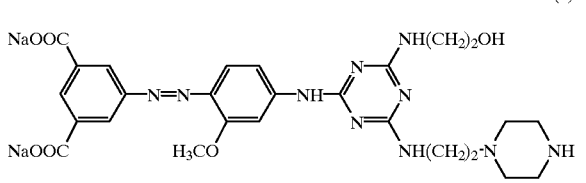

(2)

is described in patent application WO 98-12263 (example 19).

The two monoazo dyes mentioned above as well as other structurally similar dyes mentioned in this patent and in these patent applications, representing the state of the art, however do not satisfy all the required demands when used in recording liquids for ink jet printing. Neither do they satisfy all the required demands if they are used in the formulation of inks for ink jet printing that should provide brilliant images or colorings with excellent color rendition (extended gamut) on any type of recording medium as plain or coated paper, coated or uncoated, opaque or transparent synthetic materials, because these yellow monoazo dyes are either not brilliant enough or too reddish.

Dyes used for recording liquids for ink jet printing have to show a good solubility in the essentially aqueous ink liquid, they have to penetrate into the recording medium and should not show dye aggregation on the surface of the recording medium ("bronzing"). They need to provide printed images having high optical density, good water fastness and good light stability. They need to be stable in the ink even when the recording liquid is stored for a long time under adverse conditions.

Various types of compositions have been proposed as inks for ink jet printing. Typical inks comprise one or more dyes, water, organic cosolvents and other additives.

The inks have to meet the following criteria:

(1) The ink gives high quality images on any type of recording medium.
(2) The ink gives printed images exhibiting good water fastness.
(3) The ink gives printed images exhibiting good light stability.
(4) The ink gives printed images exhibiting excellent smudge behavior.
(5) The ink does not clog jetting nozzles even when these are kept uncapped while recording is suspended for long periods.
(6) The ink can be stored for long periods of time without deterioration of its quality.
(7) The values of the physical properties of the inks as viscosity, conductivity and surface tension are all within defined ranges well suited for the intended use.
(8) The ink has to be non toxic, not flammable and safe.

DESCRIPTION OF THE INVENTION

This invention relates to novel yellow monoazo dyes not showing a reddish tint, especially for ink jet printing, providing brilliant images or colorings with excellent color rendition (extended gamut).

Another object of the present invention is the provision of liquid dye preparations, especially of recording liquids for ink jet printing, showing a spectrally unchanged tint on any type of recording medium as plain or coated paper, coated or uncoated, opaque or transparent synthetic materials.

A further object of the present invention is to provide recording liquids satisfying also all the other requirements mentioned above.

In has now unexpectedly been found that these two requirements are satisfied by monoazo dyes comprising an aminoalkylsulfonic acid group in the triazine ring.

The present invention relates to novel monoazo dyes of general formula (3)

(3)

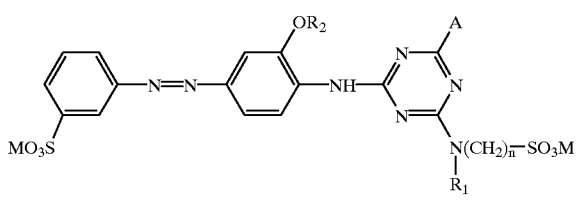

wherein
- $R_1$ represents hydrogen or alkyl with 1 to 6 C atoms;
- n is 2, 3 or 4;
- A represents $NR_3R_4$, wherein $R_3$ and $R_4$ independently represent hydrogen; alkyl with 1 to 8 C atoms; substituted alkyl with 2 to 6 C atoms, where the substituents are selected from the group consisting of OH, $OCH_3$, COOM and $SO_3M$; aralkyl; aryl or substituted aryl, where the substituents are selected from the group consisting of $OCH_3$, Cl, Br, COOM and $SO_3M$; or where $R_3$ and $R_4$ together form a ring with or without a hetero atom;
- $R_2$ represents alkyl with 1 to 6 C atoms; and
- M represents hydrogen, a metal cation or an ammonium cation, which may be substituted by one or more alkyl or substituted alkyl groups each having from 1 to 12 C atoms.

Preferred are monoazo dyes of formula (4)

(4)

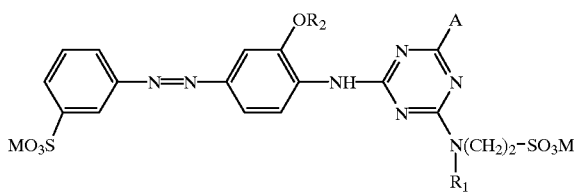

wherein A, $R_1$, $R_2$ and M are as described above.

Especially preferred are monoazo dyes of formulas (3) and (4), wherein A and M are as described above and wherein $R_1$ represents hydrogen or $CH_3$ and $R_2$ represents $CH_3$ or $CH_2CH_3$ and n has a value of 2, 3 or 4 for monoazo dyes of formula (3).

Especially preferred are monoazo dyes of formula (4), wherein M, $R_1$ and $R_2$ are as described above and wherein A represents $NHCH_2CH_2SO_3M$ or $N(CH_3)CH_2CH_2SO_3M$.

The monoazo dyes of formulas (3) and (4) may be in the free acid form or in the form of inorganic or organic salts thereof. Preferably they are in the form of their alkali or ammonium salts, wherein the ammonium cation may be substituted. Examples of such substituted ammonium cations are 2-hydroxyethylammonium, bis-(2-hydroxyethyl)-ammonium, tris-(2-hydroxyethyl)-ammonium, bis-(2-hydroxyethyl)-methyl-ammonium, tris-[2-(2-methoxyethoxy)-ethyl]-ammonium, 8-hydroxy-3,6-dioxaoctylammonium and tetraalkylammonium as for example tetramethylammonium or tetrabutylammonium.

The invention not only covers pure dyes of formulas (3) and (4), but also mixtures of these dyes.

The invention further claims a process for the preparation of the monoazo dyes of formulas (3) and (4) characterized in that (i) a compound of general formula (5)

(5)

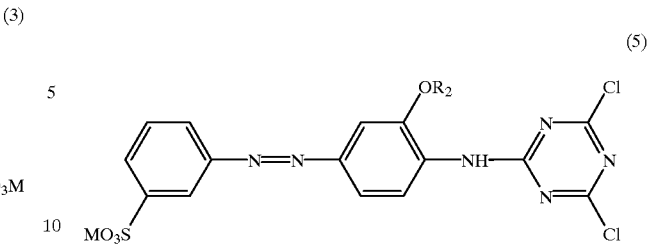

wherein $R_2$ is as described above, is reacted with a compound of formula (6)

(6)

wherein n, $R_1$ and M are as defined above, under conditions that one of the chlorine atoms of the dichlorotriazine of formula (5) is replaced by the compound of formula (6);
and
(ii) the disubstituted triazine is reacted with a compound of general formula (7)

(7)

wherein $R_3$ and $R_4$ are as defined above, under conditions that the third chlorine atom of the triazine ring is replaced by the compound of formula (7).

In the case where the two substituents at the triazine ring are identical the reaction steps i) and ii) may be combined.

The monoazo dyes of formula (3) according to the invention are used to dye cellulose containing materials, paper, cofton and viscose as well as leather and wool to provide dyed material with good water and light fastness.

Methods well known in the textile and paper industries for dyeing with substantive dyes may be used with the monoazo dyes according to our invention, preferably for the bulk or surface treatment of sized or unsized paper. The dyes may also be used in the dyeing of yarns and piece goods of cofton, viscose and linen by the exhaustion process from a long liquor or in a continuous process.

The invention furthermore relates to liquid dye preparations comprising at least one monoazo dye of formula (3). The use of such liquid dye preparations is preferred for paper dyeing. Such stable, liquid, preferably aqueous, and concentrated dye preparations may be obtained by using methods well known in the art, preferably by dissolving in suitable solvents. The possibility of preparation of such stable aqueous concentrated preparations in the course of dye synthesis itself, without intermediate isolation of the dye, is of particular advantage.

Monoazo dyes or mixtures of dyes of general formulas (3) and (4) are excellent dyes for the preparation of recording liquids for ink jet printing.

A suitable ink comprises one or more monoazo dyes according to the invention in a liquid, essentially aqueous medium. The ink contains from 0.5 to 20% by weight, preferably from 0.5 to 5% by weight, of this or these monoazo dyes, based on the total weight of the ink. The liquid medium is preferably water or a mixture comprising water and water miscible organic solvents. Suitable solvents are given for example in U.S. Pat. Nos. 4,626,284, 4,703,113, 4,963,189 and in patent applications GB 2,289,473, EP 0,425,150 and EP 0,597,672.

Color ink jet printers typically use three inks of differing hues: yellow, magenta and cyan, and optionally black. A particular set of dyes used to make the inks is called a "dye set". The dye set enables the production of high quality printed images having color appearance which meets commercial requirements, especially giving a true representation of skin tone colors. The yellow magenta, cyan and black inks comprise from 0.5 to 20% by weight, preferably from 0.5 to 5% by weight, of at least one dye in a liquid as described above.

Suitable yellow inks for such a dye set comprise a monoazo dye or a mixture of monoazo dyes of general formula (3) according to our invention. Other dyes may be included in the yellow ink, as for example Acid Yellow 23, Acid Yellow 17, Acid Yellow 250, Reactive Yellow 39, Solvent Green 7, Direct Yellow 5, Direct Yellow 86, Direct Yellow 132, Direct Yellow 173 or yellow dyes as disclosed in patent applications WO 96-24635, EP 0,755,984 and EP 0,918,074.

Preferred dyes for the yellow ink of such an ink set are the azo dyes of general formula (3) or a mixture of an azo dye of formula (3) with the yellow dye (100) of patent application EP 0,755,984.

Suitable magenta inks for such a dye set comprise a dye or a mixture of dyes of such as Acid Red 37, Acid Red 52, Acid Red 82, Acid Red 180, Acid Red 249, Acid Red 254, Acid Red 289, Acid Red 357, Reactive Red 23, Reactive Red 24, Reactive Red 45, Reactive Red 81, Reactive Red 120, Reactive Red 159, Reactive Red 180, Basic Violet 10, Direct Red 75, Cibacron Red P-6B, Cibacron Orange 2R, Lanasol Red 2R, Lanasol Red B, Lanasol Red 5B, or magenta dyes as disclosed in patent applications WO 96-24636 and EP 0,755,984.

Preferred dyes for the magenta ink of such an ink set are the magenta dye (101) of patent application WO 96-24636, Reactive Red 23 or a mixture of Acid Red 52 with the magenta dye (101) of patent application WO 96-24636.

Suitable cyan inks for such a dye set comprise a dye or a mixture of dyes of such as Acid Blue 9, Direct Blue 199, Reactive Blue 2, Drimaren Brilliant Green K4G or Basacid Blue 762.

Preferred dyes for the cyan ink of such an ink set are Direct Blue 199 or a mixture of Direct Blue 199 and Acid Blue 9.

Suitable black inks for such a dye set comprise a dye or a mixture of dyes of such as Food Black 2, Direct Black 17, Direct Black 19, Direct Black 31, Direct Black 168 or black dyes as disclosed in patent applications EP 0,859,033, EP 0,924,263 and in U.S. patent application Ser. No. 09/376,828.

Preferred dyes for the black ink of such an ink set are dye (19) of U.S. patent application Ser. No. 09/376,828 or Direct Black 31.

The present invention will be illustrated in more detail by the following examples without limiting the scope of the claimed compounds in any way.

EXAMPLES

Example 1

The monoazo dye (100) of Table 1 was prepared in the following way:

Solution A:
A mixture of 84.7 g (0.6 moles) of hydroxymethanesulfonic acid sodium salt and 69.8 ml (0.6 moles) of o-anisidine in 250 ml of water were stirred for 1 hour at 60° C. An aqueous solution of the compound of formula (8) was obtained in this way.

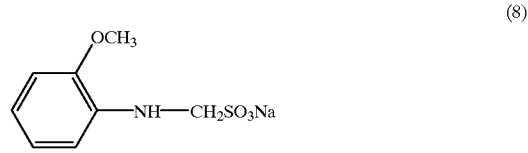

(8)

Suspension B:
107.1 g (0,6 moles) of metanilic acid were dispersed in 200 ml of water. 120 ml of an aqueous solution of hydrochloric acid (37%) to a temperature from 0° to 5° C. 150 ml of an aqueous solution of sodium nitrite (4N) were added within 60 minutes under stirring at an internal temperature from 0° to 5° C. Afterwards the mixture was stirred for a further hour at this temperature. The excess of nitrous acid was removed by reaction with sulfaminic acid. In this way an aqueous suspension of metanilic acid diazonium saft was obtained.

Preparation of the dye of formula (9):
The cold solution A was added under stirring within 60 minutes to suspension B at an internal temperature of 5° to 10° C. while maintaining pH at a value from 2 to 4 by addition of an aqueous solution of sodium hydroxide (20%). Stirring was continued for 2 hours at a temperature of 5° to 20° C. and for a further 16 hours at room temperature. The dye was salted out by addition of sodium chloride, filtered off and purified by washing with water/ethanol. 105 g of the dye of formula (9) were obtained.

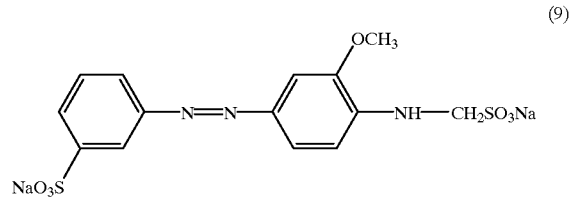

(9)

Solution C:
17,8 g (40 mmoles) of the dye of formula (9), 70 ml of water and 6 ml of NaOH (30%) were stirred for 1 hour at 90° C. An aqueous solution of the compound of formula (10) was obtained in this way.

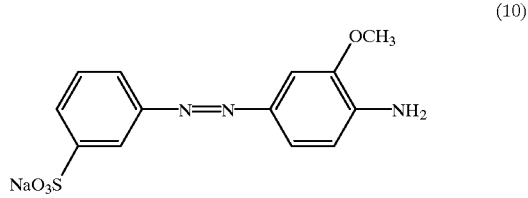

(10)

Preparation of the monoazo dye (100):
The cold solution C was added under stirring within 60 minutes to a suspension of 8.2 g of cyanuric chloride in 80 ml of water at an internal temperature of from 5° to 10° C. while maintaining pH at a value from 6 to 8 by addition of an aqueous solution of sodium hydroxide (20%). Stirring was continued for 2 hours at a temperature of from 5° to 20° C. and for a further 2 hours at room temperature. 23.7 g (160 mmoles) of taurine sodium salt in 100 ml of water were added to the suspension obtained before. Stirring was continued for 18 hours at 80° C. and a pH value of 10. Afterwards the solution was cooled down to room temperature, the dye was salted out by addition of sodium chloride, filtered off and purified by double precipitation from water/ethanol. 13 g of the dye of formula (100) were obtained.

The monoazo dyes (101) to (105) may be prepared in a similar way by using appropriate starting materials.

Monoazo dyes according to the invention prepared in this way are listed in Table 1 together with the position of their absorption maximum.

TABLE 1

| Dye | $R_1$ | A | $R_2$ | M | $\lambda_{max}$ (nm) in $H_2O$ |
|---|---|---|---|---|---|
| (100) | H | $NH(CH_2)_2SO_3M$ | $CH_3$ | Na | 387 |
| (101) | H | $NH(CH_2)_2SO_3M$ | $CH_2CH_3$ | K | 386 |
| (102) | $CH_3$ | $N(CH_3)(CH_2)_2SO_3M$ | $CH_3$ | Na | 393 |
| (103) | H | $N(CH_2CH_2OH)_2$ | $CH_3$ | Na | 391 |
| (104) | $CH_3$ | $N(CH_2CH_2OH)_2$ | $CH_3$ | Na | 392 |
| (105) | H | (m-tolyl-SO_3 group) | $CH_3$ | Na | 388 |

PREPARATION OF THE EXAMPLES

The present invention, as far as it relates to inks, is further illustrated by the following examples using monoazo dyes according to our invention from Table 1 and monoazo dyes representing the state of the art. 100 g of each ink were prepared by heating the necessary amount of dye (2–5 g) glycerol (5 g), ethylene glycol (5 g) and a biocide solution (Promexal X50, available from Zeneca, Manchester, England) (1.2 g) together with water at 50° C. under stirring for about 1 hour. The resulting solution was cooled down to 20° C., pH was adjusted to 7.5 and the solution was passed through a Millipore® filter of 0.5 μm pore diameter. The dye quantity was adjusted in such a way that the optical density of the printed images was the same for all dyes.

TESTING OF INK EXAMPLES

The inks were then jetted onto the two recording media IIfojet Standard Media Glossy SMGP7 and IIfojet Standard Media Clear Film SMCF7 (both available from ILFORD Imaging Switzerland GmbH, Fribourg, Switzerland) with a Hewlett-Packard ink jet printer HP560. to check their properties during printing as well as the quality of the printed images. Afterwards color coordinates of the printed samples were determined and color saturation was calculated.

Color Coordinates

L*a*b*-values were measured on printed samples using a Spectrolino spectrometer, available from Gretag/Macbeth, Regensdorf, Switzerland. Yellow dyes showing a reddish tint have a positive value of a*, those showing a greenish tint a negative value of a*.

Saturation

The saturation C* was calculated from the measured color coordinates using the equation $$C^* = \sqrt{a^{*2} + b^{*2}}$$

Brilliant dyes have a high value of C*.

The L*a*b* values (illuminant D65) and the calculated saturation values for an opaque (SMGP7) and a transparent recording medium (SMCF7) are listed in Table 6.

TABLE 6

| Dye | L*a*b* values (SMGP7) | C* value (SMGP7) | L*a*b* values (SMCF7) | C* value (SMCF7) |
|---|---|---|---|---|
| (100) | 85.1/−2.6/108.4 | 111.7 | 89.5/−11.0/102.7 | 103.3 |
| (102) | 85.3/−3.1/107.5 | 110.7 | 89.5/−11.5/100.7 | 101.4 |
| (103) | 85.5/−4.1/102.5 | 107.6 | 89.9/−12.6/99.4 | 100.2 |
| (1) | 85.1/4.5/101.6 | 104.9 | 89.8/−6.0/98.6 | 98.8 |

A comparison of the calculated C* values of printed samples from Table 6 clearly shows that inks comprising the monoazo dyes (100), (102) and (103) according to the invention have a considerably higher brilliance than an ink comprising the known monoazo dye (1) from patent application EP 0,755,984.

The results from Table 6 also clearly show that the dyes according to our invention are considerably less reddish (a* values between −2.6 and −4.1) than the known dye (1) with an a* value of +4.5.

What is claimed is:

1. A monoazo dye of formula (3)

(3)

[Structural formula of monoazo dye showing: MO_3S-phenyl-N=N-phenyl(OR_2)-NH-triazine ring with A substituent and N(CH_2)_n-SO_3M with R_1]

wherein
$R_1$ represents hydrogen or alkyl with 1 to 6 C atoms;
n is 2, 3 or 4;
A represents $NR_3R_4$, wherein $R_3$ and $R_4$ independently represent hydrogen; alkyl with 1 to 8 C atoms; substituted alkyl with 2 to 6 C atoms, where the substituents are selected from the group consisting of OH, $OCH_3$, COOM and $SO_3M$; aralkyl; aryl or substituted aryl, where the substituents are selected from the group consisting of $OCH_3$, Cl, Br, COOM and $SO_3M$; or where $R_3$ and $R_4$ together form a ring with or without a hetero atom;
$R_2$ represents alkyl with 1 to 6 C atoms;
and
M represents hydrogen, a metal cation or an ammonium cation, which may be substituted by one or more alkyl or substituted alkyl groups each having from 1 to 12 C atoms.

2. A monoazo dye according to claim 1, wherein A, $R_1$, $R_2$ and M are as defined in claim 1 and
n is equal to 2.

3. A monoazo dye according to claim 1, wherein
A and M are defined in claim 1;
n is equal to 2;
$R_1$ represents hydrogen or $CH_3$
and
$R_2$ represents $CH_3$ or $CH_2CH_3$.

4. A monoazo dye according to claim 1, wherein

M, $R_1$ and $R_2$ are as defined in claim 1;

n is equal to 2 and

A represents $NR_3R_4$, wherein $R_3$ and $R_4$ independently represent hydrogen; alkyl with 1 to 8 C atoms; substituted alkyl with 2 to 6 C atoms, where the substituents are selected from the group consisting of OH, $OCH_3$, COOM and $SO_3M$.

5. A monoazo dye according to claim 1, wherein

M, $R_1$ and $R_2$ are as defined in claim 1;

n is equal to 2 and

A represents $NHCH_2CH_2SO_3M$ or $N(CH_3)CH_2CH_2SO_3M$.

6. Process for the preparation of a monoazo dye of formula (3), wherein (i) a compound of general formula (5)

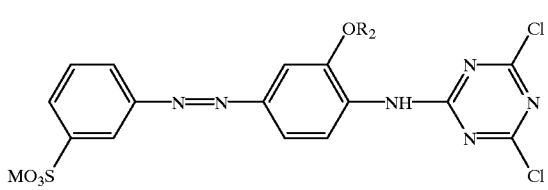

wherein $R_2$ is as defined in claim 1, is reacted with a compound of formula (6)

wherein $R_1$ and M are as defined in claim 1 under conditions where one of the chlorine atoms of the dichlorotriazine of formula (5) is replaced by the compound of formula (6);

and (ii) the disubstituted triazine is reacted with a compound of general formula (7)

wherein $R_3$ and $R_4$ are as defined in claim 1, under conditions that the third chlorine atom of the triazine ring is replaced by the compound of formula (7).

7. Process for dyeing cellulose containing materials, paper, cotton, viscose, leather and wool by applying thereto a monoazo dye according to any one of claims 1 to 5.

8. A liquid dye preparation comprising at least one monoazo dye or a mixture of monoazo dyes according to any one of claims 1 to 5.

9. An ink for ink jet printing, comprising at least one monoazo dye or a mixture of monoazo dyes according to any one of claims 1 to 5.

10. An ink for ink jet printing, comprising in addition to at least one monoazo dye or a mixture of monoazo dyes according to any one of claims 1 to 5 one or more other dyes.

* * * * *

UNITED STATES PATENT AND TRADEMARK OFFICE
CERTIFICATE OF CORRECTION

PATENT NO.    : 6,320,031 B1
DATED         : November 20, 2001
INVENTOR(S)   : Baettig et al.

It is certified that error appears in the above-identified patent and that said Letters Patent is hereby corrected as shown below:

Title page,
Item [30], Foreign Application Priority Data, after "99810158" insert -- .8 --.

Column 4,
Line 43, delete "cofton" and insert -- cotton --.
Line 49, delete "yams" and insert -- yarns --.
Line 50, delete "cofton" and insert -- cotton --.

Column 6,
Line 24, delete "saft" and insert -- salt --.

Signed and Sealed this

First Day of October, 2002

Attest:

Attesting Officer

JAMES E. ROGAN
Director of the United States Patent and Trademark Office